(12) United States Patent
Lai (10) Patent No.: US 9,547,785 B2
(45) Date of Patent: Jan. 17, 2017

(54) BARCODE SCANNER AND OPERATIONAL METHOD OF THE SAME (71) Applicant: Qisda Corporation, Taoyuan (TW)

(72) Inventor: Chih-Feng Lai, Taipei (TW)

(73) Assignee: Qisda Corporation, Taoyuan County (TW)

( * ) Notice: Subject to any disclaimer, the term of this patent is extended or adjusted under 35 U.S.C. 154(b) by 0 days.

(21) Appl. No.: 14/828,484

(22) Filed: Aug. 17, 2015

(65) Prior Publication Data
US 2016/0055361 A1    Feb. 25, 2016

(30) Foreign Application Priority Data

Aug. 19, 2014 (TW) .............................. 103128475 A (51) Int. Cl.
G06K 7/10    (2006.01)
G06K 7/14    (2006.01)

(52) U.S. Cl.
CPC ....... G06K 7/10732 (2013.01); G06K 7/10792 (2013.01); *G06K 7/146* (2013.01); *G06K 7/1443* (2013.01)

(58) Field of Classification Search
CPC combination set(s) only.
See application file for complete search history.

(56) References Cited

U.S. PATENT DOCUMENTS

| 7,270,272 | B2 |   | 9/2007  | Zhu et al. |   |
|-----------|----|---|---------|-------|----|
| 7,562,825 | B2 | * | 7/2009  | Itou .................... | G06K 7/10722 235/454 |
| 7,738,678 | B2 |   | 6/2010  | Breed et al. |   |
| 9,152,834 | B2 | * | 10/2015 | Madej ................ | G06K 7/10821 250/235 |
| 2015/0339506 | A1 | * | 11/2015 | Chen .................. | G06K 7/10831 235/462.21 |

* cited by examiner

*Primary Examiner* — Christle I Marshall (57) ABSTRACT

A barcode scanner comprises a compensating light source, an image capturing module and a processor. The compensating light source is used to emit a compensating light. The image capturing module is used to capture an original image including an object and to capture a second image under the compensating light. The processor is coupled with the compensating light source and the image capturing module. The processor generates a depth information of the object according to the original image, controls intensity of the compensating light according to the depth information, controls the image capturing module to capture a second image when the compensating light source emits the compensating light, obtains a target information corresponding to a target object according to the depth information, obtains a target image by mapping the target information onto the second image, locates a barcode and analyzes an information of the barcode according to the target image.

8 Claims, 13 Drawing Sheets

| | 1 | 2 | 3 | 4 | 5 | 6 | 7 | 8 | 9 | 10 | 11 | 12 | 13 |
|---|---|---|---|---|---|---|---|---|---|---|---|---|---|
| 1 | 0 | 0 | 0 | 0 | 0 | 20 | 20 | 0 | 0 | 0 | 0 | 0 | 0 |
| 2 | 0 | 0 | 0 | 0 | 25 | 30 | 30 | 25 | 0 | 0 | 0 | 0 | 0 |
| 3 | 0 | 0 | 0 | 0 | 25 | 30 | 30 | 25 | 0 | 0 | 0 | 0 | 0 |
| 4 | 0 | 0 | 139 | 140 | 140 | 138 | 141 | 142 | 140 | 141 | 142 | 137 | 0 |
| 5 | 0 | 0 | 140 | 142 | 141 | 140 | 137 | 140 | 138 | 140 | 137 | 138 | 0 |
| 6 | 0 | 0 | 141 | 140 | 140 | 138 | 139 | 141 | 143 | 143 | 138 | 140 | 0 |
| 7 | 0 | 0 | 140 | 141 | 138 | 142 | 141 | 140 | 142 | 141 | 140 | 139 | 0 |
| 8 | 0 | 0 | 138 | 139 | 140 | 141 | 205 | 210 | 205 | 140 | 142 | 141 | 0 |
| 9 | 0 | 0 | 140 | 141 | 141 | 205 | 210 | 215 | 210 | 205 | 140 | 138 | 0 |
| 10 | 0 | 0 | 140 | 140 | 140 | 210 | 215 | 220 | 215 | 210 | 139 | 140 | 0 |
| 11 | 0 | 0 | 0 | 0 | 0 | 205 | 210 | 215 | 210 | 205 | 0 | 0 | 0 |
| 12 | 0 | 0 | 0 | 0 | 0 | 200 | 205 | 205 | 200 | 0 | 0 | 0 | 0 |
| 13 | 0 | 0 | 0 | 0 | 0 | 0 | 0 | 0 | 0 | 0 | 0 | 0 | 0 |

BARCODE SCANNER AND OPERATIONAL METHOD OF THE SAME

BACKGROUND OF THE INVENTION

1. Field of the Invention

The present invention relates to a barcode scanner and an operational method of the barcode scanner, and more particularly, to a barcode scanner for detecting depth information of an object and an operational method thereof.

2. Description of the Prior Art

A barcode is a figure identification code which is arranged according to a specific encoding rule for presenting certain messages. One-dimensional barcodes, such as EAN-8, are composed of a plurality of parallel black stripes with different widths. Two-dimensional barcodes, such as the Quick Response code (QR code), are rectangular figures composed of a plurality of black rectangles, and three corners of the rectangular figure include specific positioning marks to facilitate reading. Since a barcode can be used to identify manufacturing country, product's name, manufacturing date and manufacturer's name of a product, sender's and recipient's mailing addresses, book category number or date, etc., it is therefore widely applied in many fields.

When one desires to transform a barcode into meaningful information via a barcode scanner, he or she needs to hold the barcode scanner towards the object with the barcode so as to capture an original image which includes the object. The barcode scanner then locates the barcode's location and analyzes the information recorded in the barcode. Since the barcode presents recorded information via specific arrangement of the black figures and the spaces, it would be difficult to scan a barcode if the environment surrounding the object is not uniform in brightness when the object is scanned. To avoid such situations, the barcode scanner may emit compensating light via a compensating light source to compensate the insufficient environmental lighting. When the barcode scanner is too close to the scanned object, however, most of the compensating light, if not all, is reflected from the object that it is difficult to identify the barcode.

When a barcode scanner is included as part of a Point of Sale (POS) system, since the barcode scanner may be used in a large warehouse with a complicated environment, the original image captured by the barcode scanner may include more than one object. Under such circumstances, it would be more difficult for the barcode scanner to locate the position of the barcode and would take more time to complete the scanning process. Furthermore, because the scanned object is not in a uniformed shape, the one-dimensional or two-dimensional barcode may be disposed on a curved surface of an object and thus distorted. It would be difficult to decode the barcode information transformed from the original image.

Thus, it is important to solve the problems resulted from reflection of compensating lights from objects, barcode images with complicated backgrounds, and barcode image distortion due to uneven object surfaces on which a barcode is disposed.

SUMMARY OF THE INVENTION

The invention according to one embodiment is to provide a barcode scanner for scanning a target object among an object, locating a barcode and analyzing an information of the barcode. The barcode scanner comprises a compensating light source, an image capturing module and a processor. The compensating light source is used to emit compensating light. The image capturing module is used to capture an original image including the object, and to capture a second image under the compensating light. The processor is coupled with the compensating light source and the image capturing module. The processor generates a depth information of the object according to the original image, controls intensity of the compensating light emitted by the compensating light source according to the depth information, controls the image capturing module to capture the second image when the compensating light source emits the compensating light, generates target information corresponding to a target object according to the depth information, obtains a target image by mapping the target information onto the second image, locates a bar code and analyzes information of the barcode according to the target image.

The invention according to another embodiment is to provide an operational method of a barcode scanner for scanning a target object among an object and locating a barcode. The operational method comprises: capturing at least one original image including the object; generating a depth information of the object according to the at least one original image; obtaining target information corresponding to the target object according to the depth information; emitting a compensating light with controlled intensity according to the depth information; capturing a second image including the object under the compensating light with controlled intensity; mapping the target information onto the second image so as to obtain a target image; and locating the barcode according to the target image and analyzing information of the barcode.

These and other objectives of the present invention will no doubt become obvious to those of ordinary skill in the art after reading the following detailed description of the preferred embodiment that is illustrated in the various figures and drawings.

DETAILED DESCRIPTION OF PREFERRED EMBODIMENTS

Figure 1:
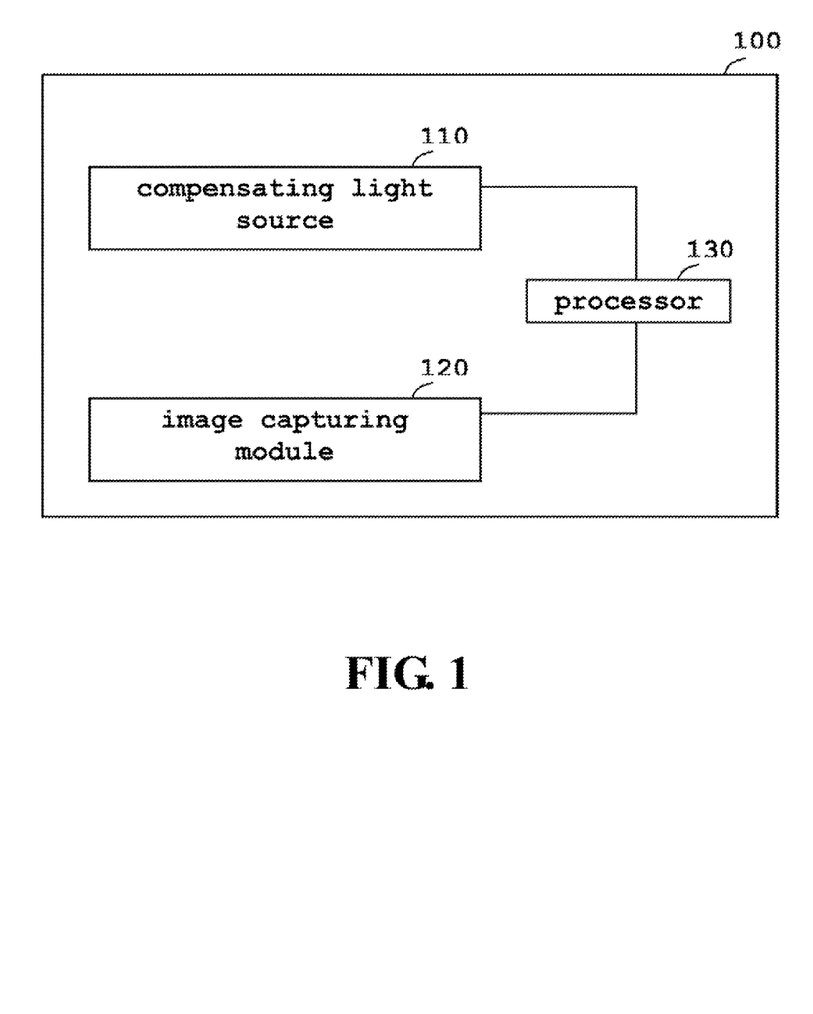
FIG. 1 is an illustrative diagram of a barcode scanner according to an embodiment of the present invention.
Figure 2:
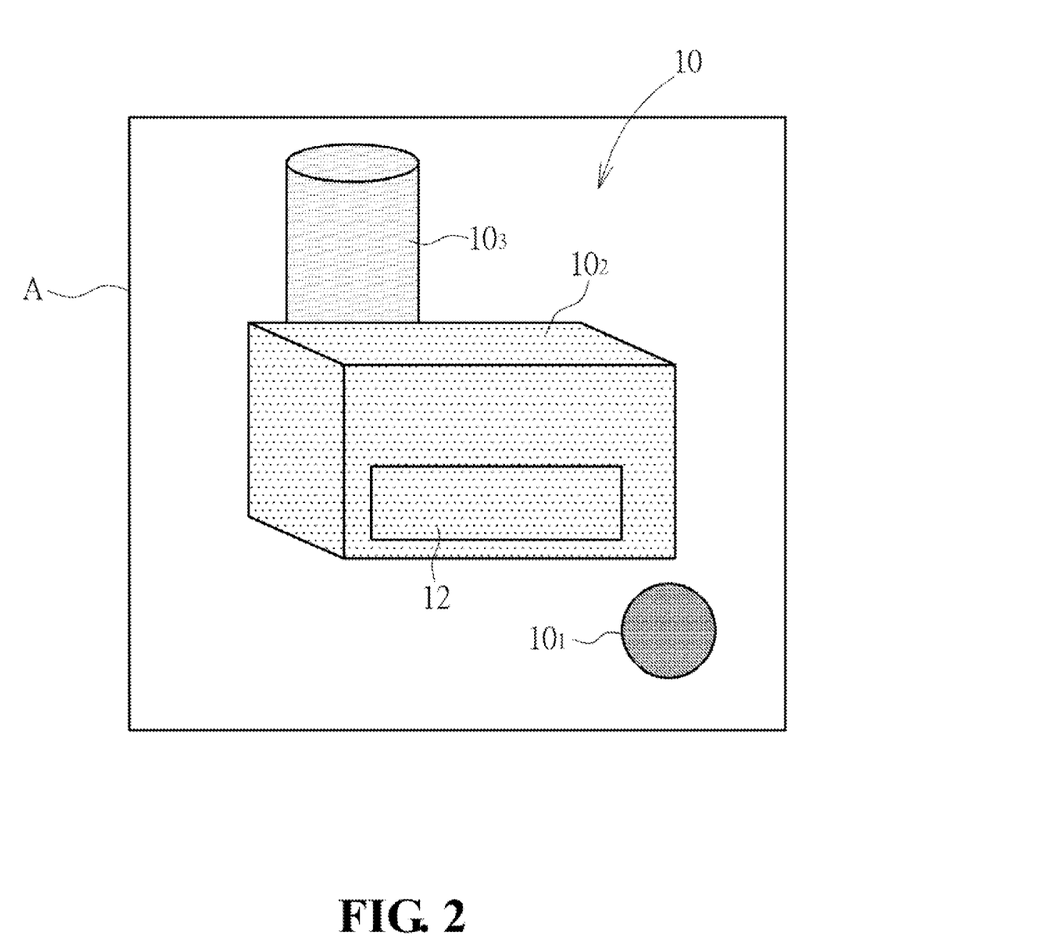
FIG. 2 is an illustrative diagram of a scanned object according to the embodiment of the present invention.

Please refer to FIG. 1 and FIG. 2. FIG. 1 is an illustrative diagram of a barcode scanner 100 according to an embodiment of the present invention. FIG. 2 is an illustrative diagram of a scanned object 10 according to the embodiment of the present invention. The object 10 comprises the sub-objects $10_1$, $10_2$ and $10_3$. The barcode scanner 100 is used to scan a target object $10_2$ among the object 10 so as to locate a barcode 13 and analyze information of the barcode 12. The barcode scanner 100 comprises a compensating light source 110, an image capturing module 120 and a processor 130. The compensating light source 110 is used to emit a compensating light onto the object 10 so as to prevent the barcode scanner 100 from being unable to identify the image of the barcode 12 and information included therein due to insufficient environmental lighting. The image capturing module 120 is used to capture an original image A which includes the object 10. The processor 130 is coupled with the compensating light source 110 and the image capturing module 120. The processor 130 is configured to generate a depth information of the object 10 according to the original image A.

Figure 3:
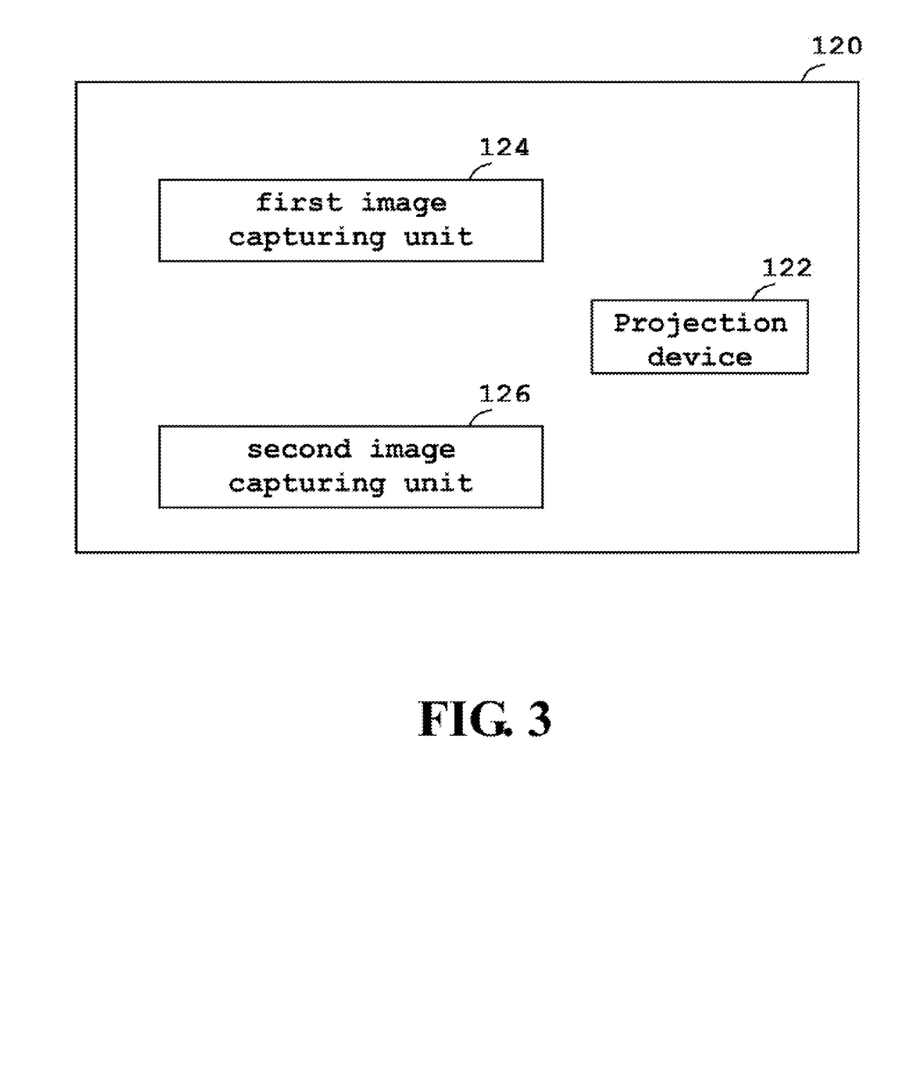
FIG. 3 is an illustrative diagram of an image capturing module according to the embodiment of the present invention.
Figure 4:
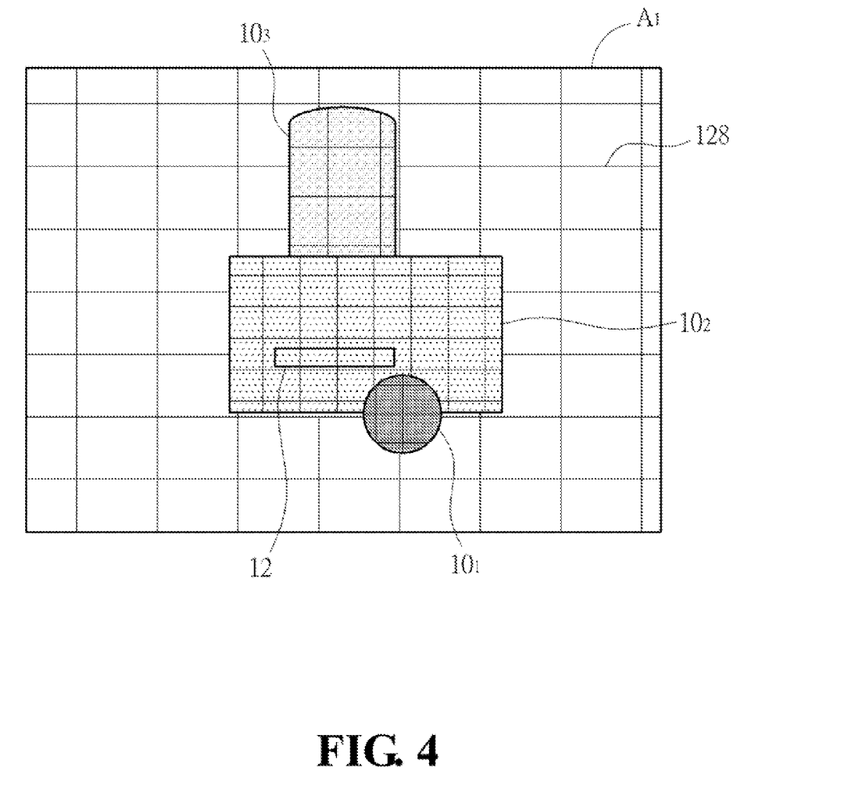
FIG. 4 is an illustrative diagram of a first image according to the embodiment of the present invention.

Please refer to FIG. 3. FIG. 3 is an illustrative diagram of the image capturing module 120 according to the embodiment of the present invention. The image capturing module 120 comprises a projection device 122, a first image capturing unit 124 and a second image capturing unit 126. The projection device 122 is used to project a pattern onto the object 10. The pattern projected by the projection device 122, for example, is a mesh pattern. The first image capturing unit 124 is used to capture a first image that includes the object 10 and the pattern projected by the projection device 122. The processor 130 uses the first image as the original image A to generate the depth information of the object 10. Since the projected mesh pattern may be distorted to certain extent upon traveling the distance between the reflected surface of the object 10 and the projection device 122, the depth in between can be calculated based on the extent of distortion of the mesh pattern. Please refer to FIG. 4. FIG. 4 is an illustrative diagram of a first image $A_1$ according to the embodiment of the present invention. The first image $A_1$ covers the sub-objects $10_1$, $10_2$ and $10_3$ of the object 10. The pattern 128 reflected from the object $10_1$, which is relatively closer to the projection device 122, has smaller mesh, and the pattern 128 reflected from the object $10_3$, which is relatively farther away from the projection device 122, has larger mesh. The processor 130 therefore is able to calculate the depth information of the object 10 based on the size of the mesh in the first image $A_1$. In other embodiment, the pattern 128 may be a pattern formed by other structured light instead of the mesh pattern, such as speckle patterns used by Microsoft Kinect™ to calculate the depth information of the object 10. Additionally, in the embodiment according to the present invention, the pattern 128 projected by the projection device 122 is an infrared pattern; the first image capturing unit 124 is able to capture lights including at least infrared rays and visible lights and transform the lights into electrical signals. The second image capturing unit 126 is able to capture lights including at least visible lights and transform the lights into electrical signals.

Figure 5A:
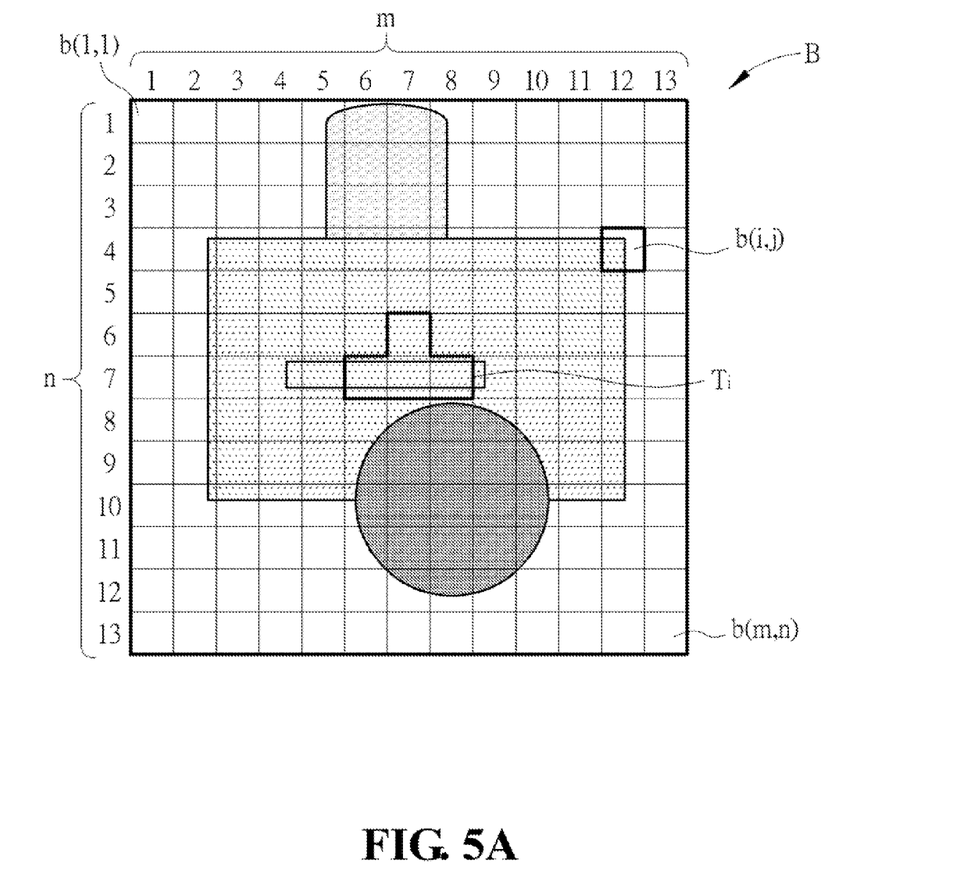
FIG. 5A is an illustrative diagram of a second image according to the embodiment of the present invention.
Figure 5B:
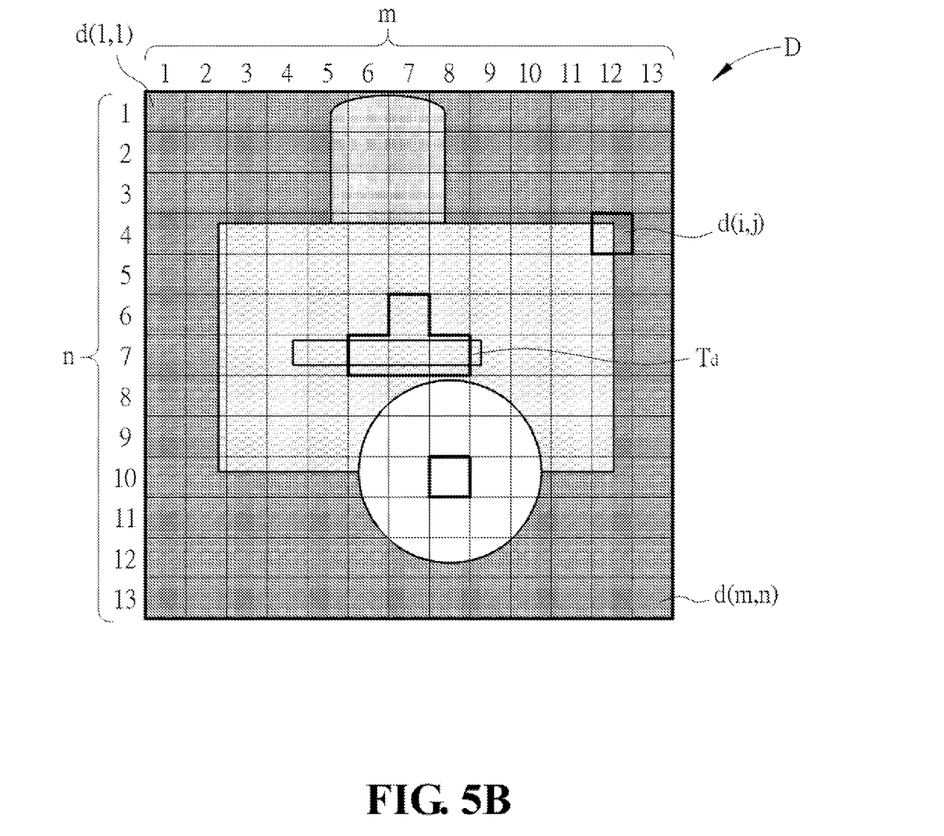
FIG. 5B is an illustrative diagram of the content of depth information according to the embodiment of the present invention.

In an embodiment according to the present invention, since the image capturing module 120 is able to capture the original image and the second image in a short period of time, the depth information generated by the processor 130 according to the original image can correspond to pixels in the second image. Please refer to FIGS. 5A and 5B. FIG. 5A is an illustrative diagram of a second image B according to the embodiment of the present invention. FIG. 5B is an illustrative diagram of the content of depth information D according to the embodiment of the present invention. The second image B comprises a plurality of pixels b(1,1) through b(m,n) and gray-scale values corresponding to the pixels. The depth information D comprises a plurality of pixels d(1,1) through d(m,n) and depths corresponding to the pixels. In FIGS. 5A and 5B, both m and n are 13. In other embodiment, however, m and n may be other positive integers and m may not be equal to n. The pixel b(i,j) in row i and column j of the second image B shown in FIG. 5A corresponds to the pixel d(i,j) in row i and column j of the depth information D shown in FIG. 5B, wherein i is a positive integer no greater than m, and j is a positive integer no greater than n. In the present invention, the pattern of correlation between the second image B and the depth information D, however, is not so limited. For example, the resolution of the second image B may be different from the resolution of the depth information D. In such situations, the pattern of correlation between the second image B and the depth information D may be one-to-many or many-to-one. Furthermore, during the capturing process either or both of the original image A and the second image B may be shifted, and therefore the pixel b(i,j) of the second image B may correspond to the pixel d(i+1,j), d(i−1,j) or other pixel in the depth information D, instead of to d(i,j).

Figure 6:
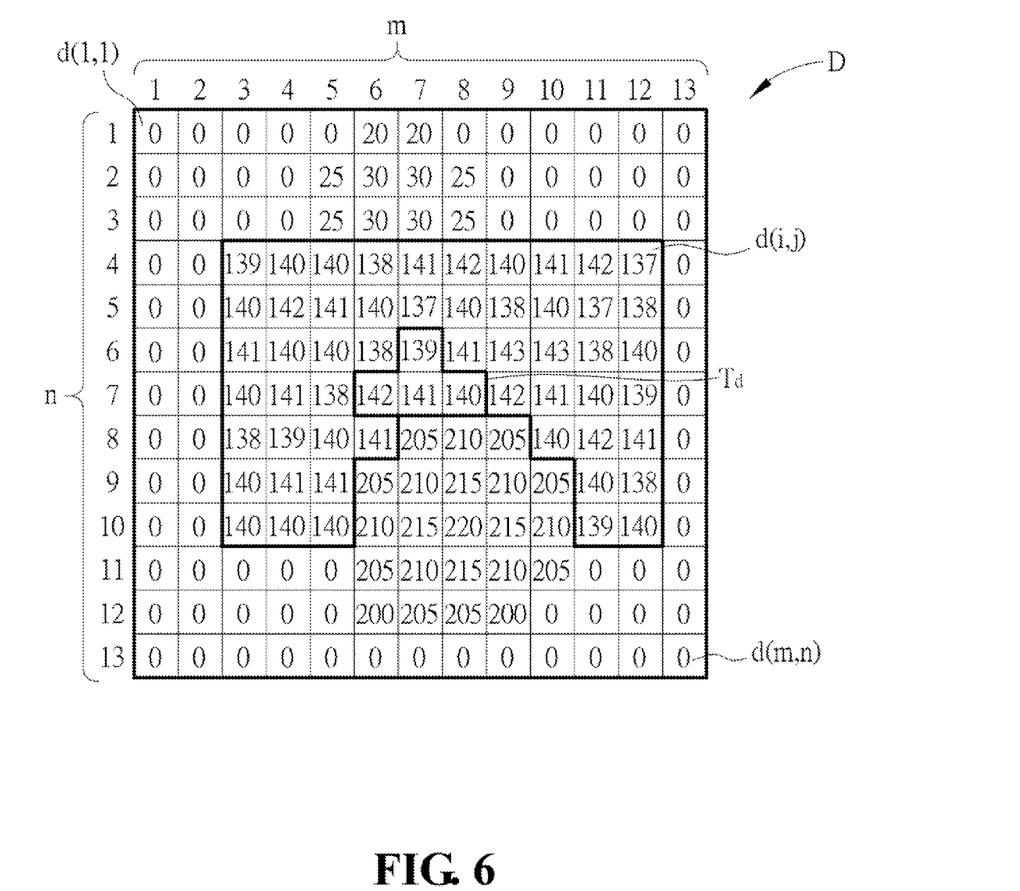
FIG. 6 is an illustrative diagram of the content of the depth information according to another embodiment of the present invention.

In FIG. 5A, brightness shown by each of the pixels from b(1,1) to b(m,n) in the second image B represents the corresponding gray-scale value. In FIG. 5B, brightness shown by each of the pixels d(1,1) through d(m,n) in the depth information D represents the corresponding depth. For example, since the brightness of the pixel b(8,10) is darker than the brightness of the pixel b(7,7) in the second image B, the gray-scale value of the pixel b(8,10) is lower than the gray-scale value of the pixel b(7,7) in the second image B. Since the brightness of the pixel d(7,7) is darker than the brightness of the pixel d(8,10) in the depth information D, the depth of the pixel d(7,7) is larger than the depth of the pixel d(8,10) in the depth information D. Please note that FIGS. 5A and 5B are used to explain the content of the depth information D but not to limit the present invention. In another embodiment of the present invention, the depth information D may merely comprise a plurality of pixels d(1,1) through d(m,n) and the corresponding depths as shown in FIG. 6, and is not presented in the form of a graph. The depth information D may also be recorded in a way other than a table. The depths of the depth information D shown in FIG. 6 relate to the gray-scale values of the graph for the depth information D shown in FIG. 5B. "0" means the farthest in distance and the largest in depth, and "1" means the closest in distance and the smallest in depth. However, the present invention is not limited thereto.

Once the depth information D is obtained, the processor 130 controls intensity of the compensating light emitted by the compensating light source 110 according to the depth information D, and the image capturing module 120 captures the second image B under the compensating light with controlled intensity. Additionally, the processor 130 obtains target information $T_d$ corresponding to the target object $10_2$ according to the depth information D, and maps the target information $T_d$ onto the second image B so as to obtain a target image $T_i$. The processor 130 is then able to locate the barcode 12 according to the target image $T_i$ and to analyze information of the barcode 12.

In an embodiment of the invention, the processor 130 determines a central pixel from the plurality of pixels d(1,1) through d(m,n) in the depth information D. For example, based on users' habits, when the second image B is captured, the target object $10_2$ having the barcode 12 is generally disposed at the center of the second image B. The processor 130 thus may consider pixel d(u,v) in the depth information D corresponding to pixel b(u,v), i.e. the central point of the second image B, as the central pixel. To facilitate aiming of the target object $10_2$, in an embodiment of the invention, the barcode scanner 100 further comprises a laser projection device. The laser projection device is used to project a spot or an icon on the object 10 for reference. The user therefore is able to aim the spot or the icon at the target object $10_2$ to make sure that the target object $10_2$ is at the central position of the image.

After the central pixel d(u,v) is determined, the processor 130 includes the central pixel d(u,v) and the depth corresponding to the central pixel d(u,v) in the target information $T_d$, and expands the range of the target information $T_d$ from the central pixel d(u,v). When the target information $T_d$ merely includes the central pixel d(u,v) and its corresponding depth, the processor 130 compares the depth corresponding to the central pixel d(u,v) with the depths corresponding to the pixels d(u−1,v), d(u,v−1), d(u+1,v) and d(u,v+1) adjacent to the central pixel d(u,v). When the differences between the depth corresponding to the central pixel d(u,v) and the depths corresponding to the pixels d(u−1,v), d(u,v−1), d(u+1,v) and d(u,v+1) are lower than a predetermined value, the processor 130 includes the adjacent pixels and the depth corresponding to the adjacent pixels into the target information $T_d$. For example, in FIG. 5B, the depth corresponding to the central pixel d(7,7) is 141, and the depths corresponding to pixels d(6,7), d(7,6), d(8,7) and d(7,8) adjacent to the central pixel d(7,7) are 142, 139, 140 and 205, respectively. The depth difference between the pixel d(6,7) and the central pixel d(7,7) is 1, the depth difference between the pixel d(7,6) and the central pixel d(7,7) is 2, the depth difference between the pixel d(8,7) and the central pixel d(7,7) is 1, and the depth difference between the pixel d(7,8) and the central pixel d(7,7) is 64. Assuming that the predetermined value is 20. The depth differences between the central pixel d(7,7) and the pixels d(6,7), d(7,6) and d(8,7) being smaller than 20 means that the pixels d(6,7), d(7,6) and d(8,7) may be on the same surface as the central pixel d(7,7). The processor 130 thus includes the pixels d(6,7), d(7,6), d(8,7) and their corresponding depths into the target information $T_d$. On the contrary, the depth difference between the pixel d(7,8) and the central pixel d(7,7) being greater than 20 means that the pixel d(7,8) may not be on the same surface as the central pixel d(7,7), and therefore the pixel d(7,8) shall not be included in the target information $T_d$. Using the same procedure, the processor 130 continues to compare the depth corresponding to the central pixel d(7,7) with the depths corresponding to pixels d(5,7), d(6,6), d(7,5), d(8,6), d(9,7), d(8,8) and d(6,8), which are not present in the target information $T_d$ but adjacent to the pixels d(6,7), d(7,6) and d(8,7) already included into the target information $T_d$. Since the depth differences between the central pixel d(7,7) and the pixels d(5,7), d(6,6), d(7,5), d(8,6), d(9,7) and d(6,8) are less than the predetermined value 20, the pixels d(5,7), d(6,6), d(7,5), d(8,6), d(9,7), d(6,8) and their corresponding depths are included into the target information $T_d$. The procedure continues until the depth differences between the central pixel d(7,7) and all other pixels not present in the target information $T_d$ but adjacent to the pixels already included into the target information $T_d$ are no longer smaller than the predetermined value 20. At this time, the target image $T_i$ is the range of the target object $10_2$ in the second image B. The processor 130 therefore is able to locate the barcode 12 according to the target image $T_i$ of the second image B corresponding to the target information $T_d$, instead of the entire second image B. The processor 130 then analyzes information of the barcode 12. The time for the processor 130 to identify the barcode 12 is thus reduced.

In an embodiment according to the invention, the processor 130 controls the compensating light source 110 to emit the compensating light according to an average depth of the depths corresponding to the pixels d(1,1) through d(m,n) included in the target information $T_d$ of the depth information D. For example, the processor 130 would increase the intensity of the compensating light when the average depth is high. In an embodiment of the present invention, the processor 130 determines the intensity of the compensating light based on a look-up table. Table 1 shows a look-up table according to an embodiment of the present invention. When the gray-scale value of the average depth is less than or equal to 25, suggesting that the target object $10_2$ is far away from the barcode scanner 100, the intensity of the compensating light is set to the maximum value 100. When the gray-scale value of the average depth is a value within the range of 151 to 149, the intensity of the compensating light is set to be 60. When the gray-scale value of the average depth is 255, meaning that the target object $10_2$ is very close to the barcode scanner 100, the intensity of the compensating light is set to be 30 to prevent the compensating light from being reflected from the target object $10_2$, making it difficult to identify the barcode 12.

TABLE 1

| Average Depth of Target Information $T_d$ | Intensity of Compensating Light |
|---|---|
| 255 | 30 |
| 254 | 30 |
| 253 | 30 |
| . . . | . . . |
| 151 | 60 |
| 150 | 60 |
| 149 | 60 |
| . . . | . . . |
| 26 | 95 |
| <=25 | 100 |

Figure 7:
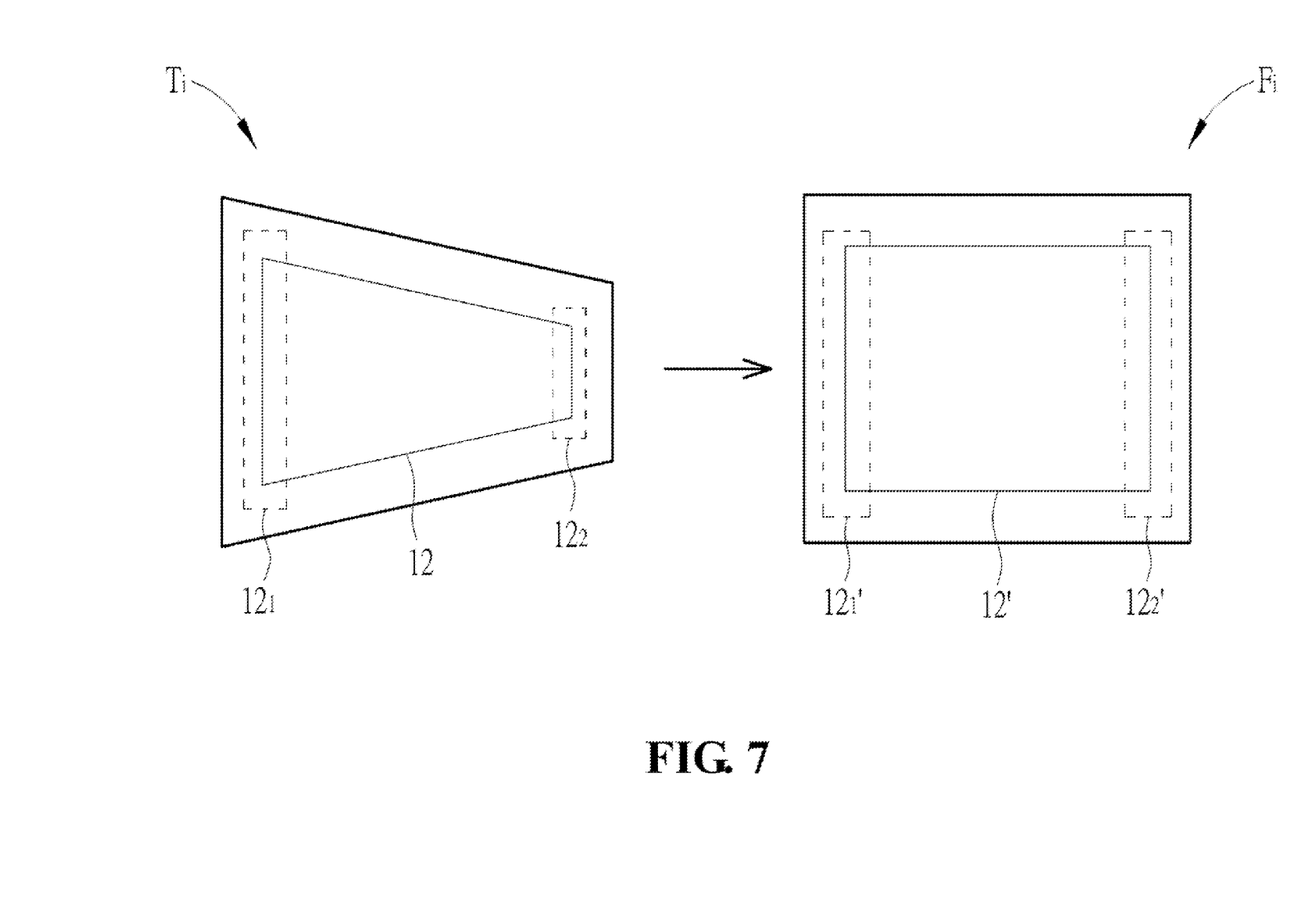
FIG. 7 is an illustrative diagram of a target image and a calibrated target image according to the embodiment of the present invention.

In an embodiment of the invention, the processor 130 calculates a difference between a maximum depth and a minimum depth of the depths corresponding to the pixels d(1,1) through d(m,n) included in the target information $T_d$. A difference greater than a threshold suggests that the barcode 12 is possibly disposed on a curved or uneven surface or on a slope so that the depths in the target information $T_d$ are diversified to some extent. Under such circumstances, if the barcode 12 is located based on the target image $T_i$ of the second image B without further processing, the position of the barcode 12 may be misjudged due to the image distortion. Thus, the processor 130 may further calibrate the target image $T_i$ to generate a calibrated target image according to the target information $T_d$ of the depth information D when the aforementioned difference is greater than the threshold. The processor 130 then locates the barcode 12 according to the calibrated target image. Taking FIG. 7 for example, FIG. 7 is an illustrative diagram of a target image $T_i$ and a calibrated target image $F_i$ according to the embodiment of the present invention. The barcode 12 in the target image $T_i$ is disposed on a slope. The part $12_2$ of the barcode 12 which is farther from the barcode scanner 100 shows a smaller image, while the part $12_1$ of the barcode 12 which is closer to the barcode scanner 100 shows a larger image. The processor 130 obtains the depths corresponding to the target image $T_i$ according to the target information $T_d$.

If the part $12_2$ of the barcode 12 which is farther from the barcode scanner 100 corresponds to the maximum depth $d_{max}$ of the target information $T_d$, and the part $12_1$ of the barcode 12 which is closer to the barcode scanner 100 corresponds to the minimum depth $d_{min}$ of the target information $T_d$, the difference between the maximum depth $d_{max}$ and the minimum depth $d_{min}$ being greater than the threshold would mean that the barcode 12 is severely influenced by the distortion. At this time, the processor 130 obtains the gradient of the slope in the target image $T_i$ according to the target information $T_d$ so as to recover the target image $T_i$ to the calibrated target image $F_i$. The barcode 12' in the calibrated target image $F_i$ then presents a normal proportion. Misjudgement of the barcode information by the processor 130 thus can be avoided.

In another embodiment of the invention, the processor 130 may use other principles, such as perspective projection, to calibrate the target image $T_i$ so as to generate the calibrated target image $F_i$.

Figure 8:
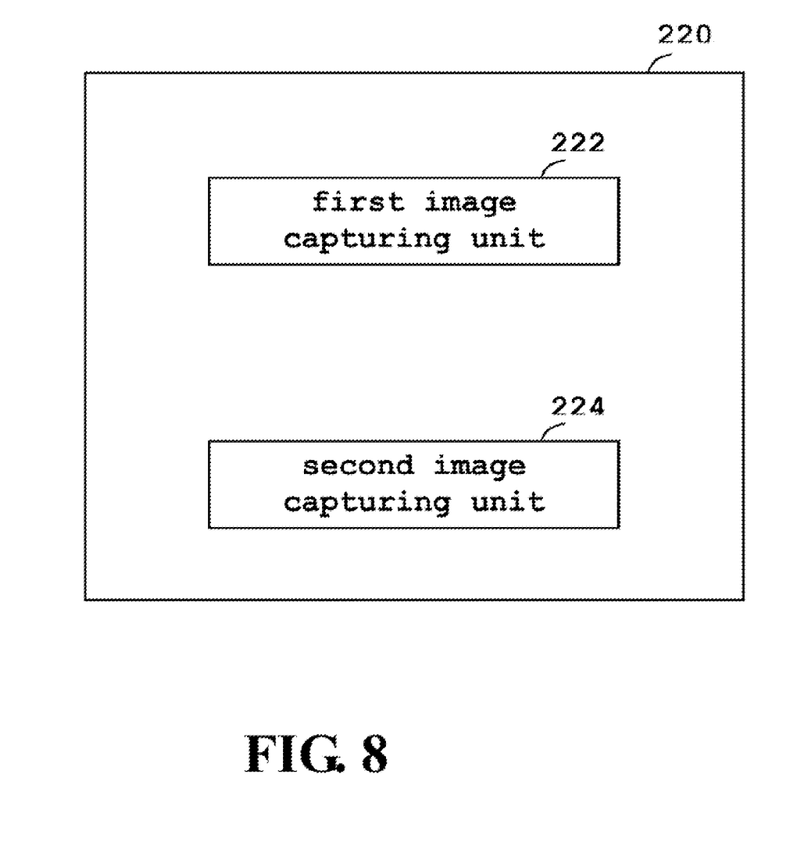
FIG. 8 is an illustrative diagram of an image capturing module according to another embodiment of the present invention.

Please refer to FIG. 8. FIG. 8 is an illustrative diagram of the image capturing module 220 according to another embodiment of the present invention. The image capturing module 220 comprises a first image capturing unit 222 and a second image capturing unit 224. The first image capturing unit 222 is configured to capture a first image $A'_1$ (not shown) and the second image B' (not shown), both including the object 10. The second image capturing unit 224 is configured to capture a third image $A'_3$ (not shown) that includes the object 10. Since the first image capturing unit 222 and the second image capturing unit 224 can capture the first image $A'_1$ and the third image $A'_3$ from different positions, the first image $A'_1$ and the third image $A'_3$ therefore present the images of the object 10 from different angles. The first image $A'_1$ and the third image $A'_3$ can be used to simulate the images seen by human eyes, and the depth information of the object 10 can be calculated based on the angle differences between the first image $A'_1$ and the third image $A'_3$ by using the stereo vision algorithm. Thus, in another embodiment of the present invention, the image capturing module 120 can be replaced by the image capturing module 220. That is, the first image $A'_1$ and the third image $A'_1$ are used by the processor 130 as the original image A to generate the depth information D, and the second image B' is used by the processor 130 as the second image B.

As described above, from the original image A captured by the image capturing module 120 of the barcode scanner 100, the processor 130 may obtain the depth information D and adjust the intensity of the compensating light. It thus avoids the compensating light being reflected from the object, making it difficult to identify the barcode 12. The target image $T_i$ is also obtained from the depth information D, so that the time consumed on identifying barcodes with complicated backgrounds in the image is reduced. Furthermore, the depth information D is used by the barcode scanner 100 to calibrate the target image $T_i$ when the barcode 12 is distorted due to uneven surfaces of the object to which the barcode 12 is attached.

Figure 9:
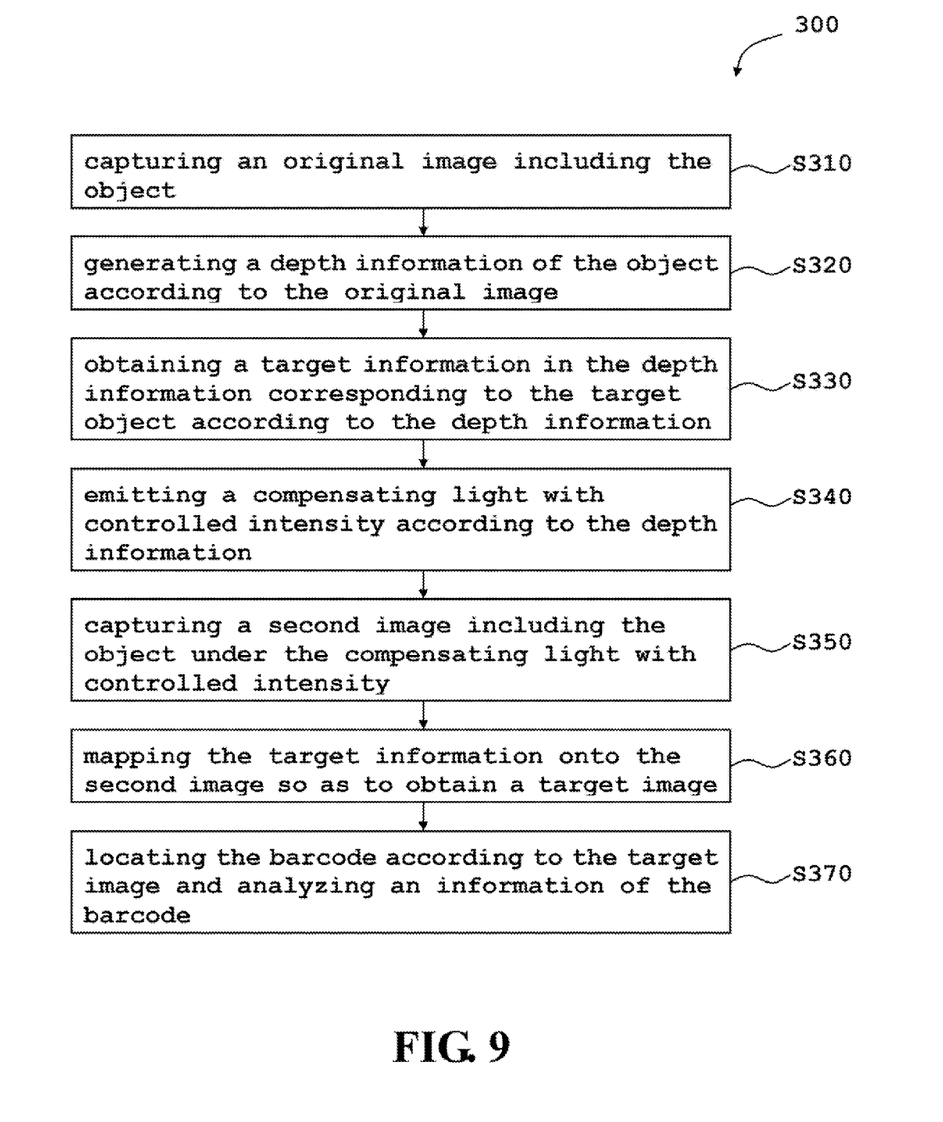
FIGS. 9-12 are flowcharts of the operational method of a barcode scanner according to the embodiment of the present invention.

Please refer to FIG. 9. FIG. 9 is the flowchart of the operational method 300 of the barcode scanner 100 according to an embodiment of the present invention. The operational method 300 is used to scan the target object $10_2$ among the object 10 to locate and analyze the barcode 12. The operational method 300 comprises the steps of S310 through S370. In the step S310, an original image A including the object is captured. In the step S320, the depth information D of the object is generated according to the original image A. In the step S330, the target information $T_d$ in the depth information D corresponding to the target object $10_2$ is obtained according to the depth information D. In the step S340, the compensating light is emitted with controlled intensity according to the depth information D. In the step S350, the second image B including the object 10 is captured under the compensating light with controlled intensity. In the step S360, the target information $T_d$ is mapped onto the second image B so as to obtain a target image $T_i$. And in the step S370, the barcode 12 is located according to the target image $T_i$ and information of the barcode 12 is then analyzed.

Figure 10:
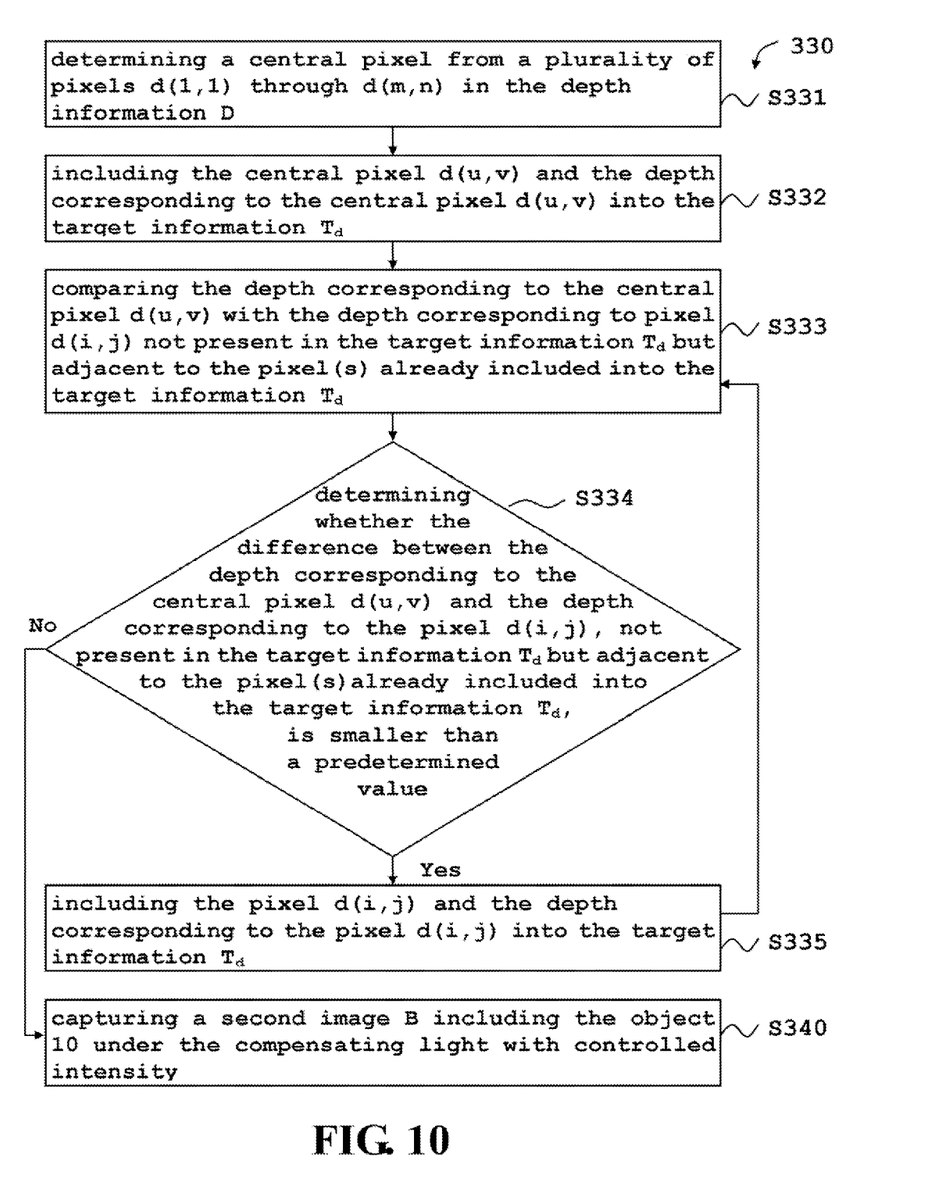

In an embodiment of the present invention, the step S330 further comprises the steps of S331 through S335, as shown in FIG. 10. In the step S331, a central pixel is determined from a plurality of pixels d(1,1) through d(m,n) in the depth information D. In the step S332, the central pixel d(u,v) and the depth corresponding to the central pixel d(u,v) is included into the target information $T_d$. In the step S333, the depth corresponding to the central pixel d(u,v) is compared with the depth corresponding to pixel d(i,j), which is not present in the target information $T_d$ but adjacent to the pixel(s) already included into the target information $T_d$. In the step S334, when the difference between the depth corresponding to the central pixel d(u,v) and the depth corresponding to the pixel d(i,j) not present in the target information $T_d$ but adjacent to the pixel(s) already included into the target information $T_d$ is smaller than a predetermined value, go to the step S335. Otherwise, go to the step S340. And in the step S335, the pixel d(i,j) and the depth corresponding to the pixel d(i,j) is included into the target information $T_d$, and go to the step S333. The steps from S333 to S225 are repeated until the differences between the depth corresponding to the central pixel d(u,v) and the depths corresponding to all pixels not present in the target information $T_d$ but adjacent to the pixel(s) already included into the target information $T_d$ are no longer smaller than the predetermined value.

Figure 11:
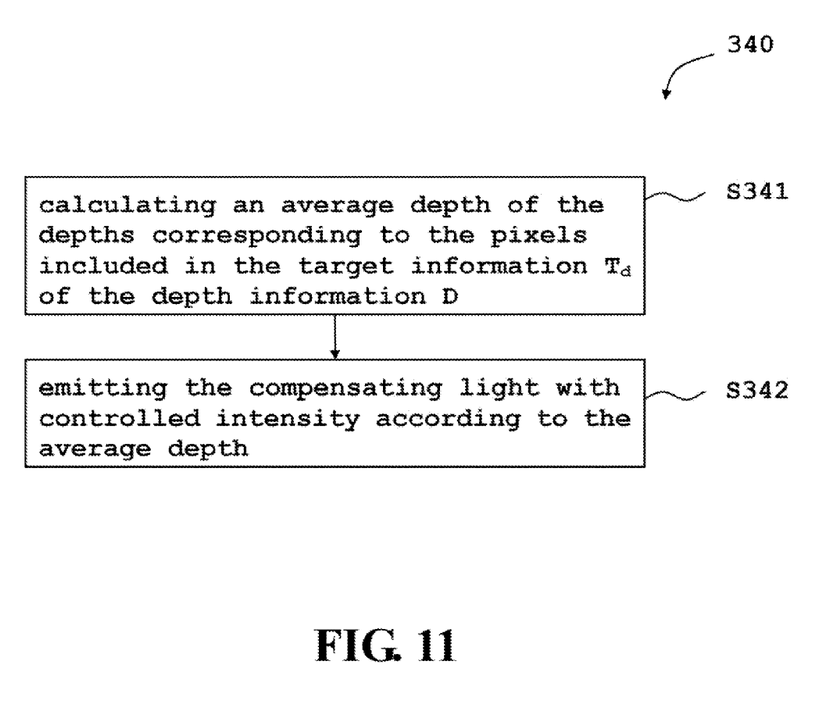

In an embodiment of the present invention, the step S340 further comprises the steps S341 and S342, as shown in FIG. 11. In the step S341, an average depth of the depths corresponding to the pixels included in the target information $T_d$ of the depth information D is calculated. In the step S342, the compensating light with controlled intensity is emitted according to the average depth. The larger the average depth, the higher the intensity of the compensating light.

Figure 12:
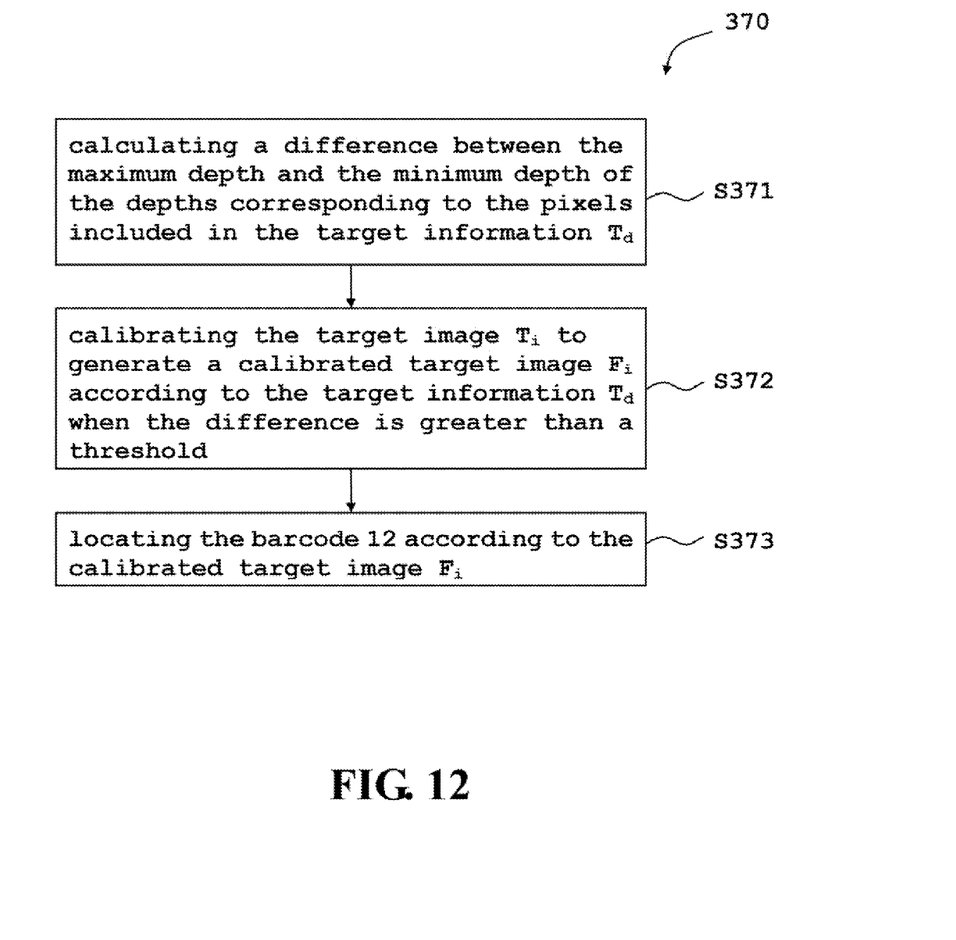

In another embodiment of the present invention, the operational method 300 further comprises the steps of S371 through S373, as shown in FIG. 12. In the step S371, a difference between the maximum depth and the minimum depth of the depths corresponding to the pixels included in the target information $T_d$ is calculated. In the step S372, when the aforementioned difference is greater than a threshold, the target image $T_i$ is calibrated to generate a calibrated target image $F_i$ according to the target information $T_d$. And in the step S373, the barcode 12 is then located according to the calibrated target image $F_i$. In the operational method 300 of the barcode scanner 100, the intensity of the compensating light is adjusted according to the depth information D, thus the problem of the compensating light being reflected from the object thus making it difficult to identify the barcode 12 may be avoided. The target image $T_i$ is also obtained from the depth information D, so that the time consumed on identifying barcodes with complicated backgrounds in the image is reduced. Furthermore, the depth information D is used in the operational method 300 to calibrate the target image $T_i$ when the barcode 12 is distorted due to uneven surfaces of the object to which the barcode 12 is attached.

In conclusion, the barcode scanner and the operational method of the barcode scanner of the embodiments of the present invention adjust intensity of compensating lights according to the depth information. The problem of the compensating light being reflected from an object thus making it difficult to identify the barcode is avoided. The target image is also obtained from the depth information, so that the time consumed on identifying barcodes with complicated backgrounds in the image is reduced. Furthermore, the depth information is used to calibrate target images when the barcode is distorted due to uneven surfaces of the object to which the barcode is attached.

Those skilled in the art will readily observe that numerous modifications and alterations of the device and method may be made while retaining the teachings of the present invention.

What is claimed is:

1. A barcode scanner for scanning a target object among an object, locating a barcode and analyzing information of the barcode, the barcode scanner comprising:
    a compensating light source, configured for emitting a compensating light;
    an image capturing module, configured for capturing at least one original image including the object and capturing a second image including the object under the compensating light, the image capturing module comprising:
        a first image capturing unit, configured for capturing a first image and the second image, in which both include the object; and
        a second image capturing unit, configured for capturing a third image including the object,
        wherein the at least one original image comprises the first image and the third image; and
    a processor, coupled with the compensating light source and the image capturing module,
    wherein the processor generates a depth information of the object according to the at least one original image, controls intensity of the compensating light emitted by the compensating light source according to the depth information, controls the image capturing module to capture the second image when the compensating light source emits the compensating light, obtains a target information corresponding to the target object according to the depth information, obtains a target image by mapping the target information onto the second image, and locates the barcode according to the target image so as to analyze an information of the barcode.

2. The barcode scanner of claim 1, wherein the depth information comprises a plurality of pixels and a plurality of depths corresponding to the plurality of pixels, the processor determines a central pixel from the plurality of pixels, the target information comprises at least the central pixel and a depth corresponding to the central pixel, the processor compares the depth corresponding to the central pixel with depths corresponding to pixels not present in the target information but adjacent to the plurality of pixels already included into the target information, and when the difference between the depth corresponding to the central pixel and the depths corresponding to the pixels not present in the target information but adjacent to the plurality of pixels already included into the target information is smaller than a predetermined value, the processor includes the pixels and the depths corresponding to the pixels into the target information.

3. The barcode scanner of claim 2, wherein the processor controls the compensating light source to emit the compensating light according to an average depth of the depths corresponding to the pixels included in the target information, and the larger the average depth, the higher the intensity of the compensating light.

4. The barcode scanner of claim 2, wherein the processor calculates a difference between a maximum depth and a minimum depth of the depths corresponding to the pixels included in the target information, calibrates the target image to generate a calibrated target image according to the depth information when the difference is greater than a threshold, and locates the barcode according to the calibrated target image.

5. An operational method of a barcode scanner for scanning a target object among an object and locating a barcode, the operational method comprising:
    capturing at least one original image including the object, the at least one original image comprising a first image and a third image from different visual angles;
    generating a depth information of the object according to the at least one original image;
    obtaining a target information corresponding to the target object according to the depth information;
    emitting a compensating light with controlled intensity according to the depth information;
    capturing a second image including the object under the compensating light with controlled intensity;
    mapping the target information onto the second image so as to obtain a target image; and
    locating the barcode according to the target image and analyzing an information of the barcode.

6. The operational method of claim 5, wherein the depth information comprises a plurality of pixels and a plurality of depths corresponding to the plurality of pixels, and the step of obtaining the target information corresponding to the target object according to the depth information comprises:
    determining a central pixel from the plurality of pixels;
    including the central pixel and the depth corresponding to the central pixel into the target information;
    comparing the depth corresponding to the central pixel with depths corresponding to pixels not present in the target information but adjacent to the plurality of pixels already included into the target information; and
    when the difference between the depth corresponding to the central pixel and the depths corresponding to the pixels not present in the target information but adjacent to the plurality of pixels already included into the target information is smaller than a predetermined value, including the pixels and the depths corresponding to the pixels into the target information until the differences between the depth corresponding to the central pixel and the depths corresponding to the pixels not present in the target information but adjacent to the plurality of pixels already included into the target information are no longer smaller than the predetermined value.

7. The operational method of claim 6, wherein the step of emitting the compensating light with controlled intensity according to the depth information comprises:
    calculating an average depth of the depths corresponding to the pixels included in the target information; and
    emitting the compensating light with controlled intensity according to the average depth, wherein the larger the average depth, the higher the intensity of the compensating light.

8. The operational method of claim 6, further comprising:

calculating a difference between a maximum depth and a minimum depth of the depths corresponding to the pixels included in the target information;

calibrating the target image to generate a calibrated target image according to the depth information when the difference is greater than a threshold; and locating the barcode according to the calibrated target image.

\* \* \* \* \*